United States Patent [19]

Farley

[11] 4,016,723
[45] Apr. 12, 1977

[54] SPEED MEASUREMENT SYSTEM FOR TURBINE POWER PLANT

[75] Inventor: Earl T. Farley, Altamonte Springs, Fla.

[73] Assignee: Westinghouse Electric Corporation, Pittsburgh, Pa.

[22] Filed: Oct. 21, 1975

[21] Appl. No.: 624,351

[52] U.S. Cl. .......................... 60/660; 235/151.21; 324/166; 324/173; 415/30; 361/239
[51] Int. Cl.² ........................................ F01K 13/02
[58] Field of Search ........................ 317/5; 444/1; 235/151.21; 415/15, 30; 60/660; 324/166, 173, 174, 175

[56] References Cited

UNITED STATES PATENTS

3,452,258  6/1969  Thompson ............... 415/15 X
3,780,346  12/1973  Gagnon ..................... 317/5

Primary Examiner—Allen M. Ostrager
Attorney, Agent, or Firm—H. W. Patterson

[57] ABSTRACT

A speed measurement system for converting signal pulses directly into a 13 bit binary number for input to a digital processor is disclosed. The signal pulses are generated as a function of incremental shaft rotation. A plurality of additional pulses are injected in the pulse train between successive displacement or signal pulses, such that a stream of equally spaced pulses is produced at a predetermined speed. The number of generated displacement and injected pulses are counted during predetermined time intervals for providing a direct speed measurement.

11 Claims, 9 Drawing Figures

SPEED MEASUREMENT SYSTEM FOR TURBINE POWER PLANT

CROSS REFERENCE TO RELATED APPLICATION

Ser. No. 468,972, which is a continuation of Ser. No. 247,877, now abandoned, which is a continuation-in-part of Ser. No. 246,900, now abandoned, said original application being filed on Apr. 24, 1972, and all entitled "General System and Method For Starting, Stopping, Synchronizing, and Operating a Steam Turbine with Digital Computer Control" and assigned to the present assignee is incorporated by reference herein for the purpose of disclosing the details of the turbine system generally referred to herein.

BACKGROUND OF THE INVENTION

The present invention relates broadly to an improved system for controlling the operation of a turbine power plant; and more particularly to an improved speed measurement system, for controlling the rotational speed of the turbine which provides rapid updating and high resoluting capability for direct digital input of turbine speed to a digital processor of the system.

In systems for controlling the operation of a turbine power plant, the rotational speed of the turbine shaft is considered in a control loop either as an end controlled or intermediate controlled system variable. Various systems for determining turbine speed have been developed over the years in order to provide an accurate speed signal for positioning the speed inlet valves to control the outlet of the turbine.

For example, an analog control system is described in U.S. Pat. No. 3,098,176, ELECTRIC LONG RANGE SPEED GOVERNOR, by M. A. Eggenberger, P. H. Troutman and J. F. Sauter, whereby a tachometer generator, which is connected to the turbine shaft generates a DC signal having a magnitude proportional to the actual speed of the turbine. In U.S. Pat. No. 3,097,488, TURBINE CONTROL SYSTEM, by M. A. Eggenberger, P. H. Troutman and E. C. Callan, there is described a system with a permanent magnet generator that is attached to the turbine shaft which generates an AC signal having a frequency proportional to actual turbine speeds. This AC signal is converted to a DC signal by saturable magnetic cores to provide a feedback voltage signal proportional to the frequency of the AC signal; and therefore, the speed of the turbine. The more recently developed turbine control systems, utilize a toothed wheel connected to the turbine shaft; and pulses generated by a reluctance pick-up adjacent to the toothed wheel are translated into a DC voltage which is utilized in an analog control circuit. A typical circuit for accomplishing the desired translation from a pulse frequency to a DC voltage is shown in U.S. Pat. No. 3,090,929, CONTROLLER CIRCUITRY WITH PULSE WIDTH MODULATOR by F. P. Thompson, assigned to the same assignee as this application. The frequency to voltage conversion technique described in the Thompson patent has operated satisfactorily in an electrohydraulic control system such as is described in an article by M. Burnbaum and E. G. Noyes presented to ASME-IEEE NATIONAL POWER CONFERENCE in Albany, N.Y., Sept. 19-23, 1965. In applying the frequency to voltage conversion technique to this type of system, the speed voltage may be applied directly to a control network of the general type described in U.S. Pat. No. 3,452,258, DIGITAL ANALOG FEEDBACK CONTROL SYSTEM EMPLOYING SOLID STATE DIGITAL POTENTIOMETER, by F. P Thompson, also assigned to the same assignee as this application.

With the advent of the turbine control systems of the digital-electrohydraulic type rendered the frequency to voltage conversion technique impractical. A system of this type is described in great detail in copending U.S. patent application Ser. No. 408,972, which is a continuation of Ser. No. 247,877, now abandoned, which is a continuation-in-part of Ser. No. 247,440, now abandoned, and entitled GENERAL SYSTEM AND METHOD FOR STARTING, SYNCHRONIZING AND OPERATING A STEAM TURBINE WITH DIGITAL COMPUTER CONTROL, all filed by Theodore C. Giras and Robert Uram and assigned to the present assignee; said original application being filed on Apr. 24, 1972. This is a consequence of the fact that digital equipment, without an analog or digital converter, operates only in response to digital input signals. For example, the central processing unit of a digital computer continuously performs digital routines under the control of programmed instructions. However, since a computer can perform only one operation at a time, externally generated data can only be accepted by the computer by interrupting the routine in process or by waiting until the routine which is running has been completed. Determinations of this nature are made by the executive program which establishes priorities for the various routines including the input routines.

In real time control, various systems status signals are generated independently in the computer cycle time. System conditions which can be expressed in terms of yes or no, or on or off, can be monitored by switches or relays which by their very nature generates signals in binary form. The states of the variable being monitored is stored by the condition of the switch or relay until the central processing unit of the computer is ready to accept the stored data. Such inputs are known as contact inputs. Numerous schemes for multiplexing and paralleling contact inputs have been developed to improve the efficiency of the computer system. Where analog functions are input to the computer, they must be transformed into digital signals before they can be accepted. Many types of analog to digital converters have been developed to form this transformation. Such transformation may typically be performed by converting the DC voltage into pulses having a frequency which is a function of the analog voltage level in a voltage to frequency converter. The pulses so generated are indicated in a digital counter and the resultant signal is fed into the central processing unit of the computer. Such conversion takes time, and as frequent sampling of the variable being monitored is central to proper dynamic control of the system, the converter may be engaged for a considerable period of its operating time merely monitoring a single analog signal. Economic considerations dictate the number of analog to digital converters that can be provided in a system.

In copending U.S. patent application Ser. No. 412,513, filed by John F. Reuther, TURBINE SPEED CONTROLLING VALVE OPERATION, filed Nov. 2, 1973 and assigned to the same assignee as this application, there is disclosed an improved system for determining the speed of rotation of the output shaft of a turbine where pulses generated by a displacement pulse generator connected to the turbine shaft are digitally transformed into signals directly usable by a computer in digital input equipment.

In this system, displacement pulses are generated at a rate proportional to the rotational speed of the turbine. Time pulses are generated at a predetermined rate. The rate of the timing pulses is substantially greater than the generated rate of the displacement pulses at the upper range of turbine speed. A number of displacement pulses are counted during a predetermined time interval; and the number of timing pulses are counted during the generation of a predetermined number of the displacement pulses. A signal corresponding to the counted number of the displacement pulses is generated as well as a signal corresponding to the counted number of the timing pulses. The timing pulses are utilized to control the steam inlet valves when the speed of the turbine is above a predetermined speed; and the displacement pulse count is used to operate the steam inlet valves when the speed of the turbine is below a predetermined speed. In other words, the speed is determined either as a function of the time interval required to accumulate a preselected count of the displacement pulses when the turbine is operating above a predetermined speed; or the speed is determined as a function of the number of displacement pulses accumulated in a predetermined time interval when the turbine is operating below a predetermined speed. in order to avoid losing time pulses during the interval required for inputting the timing pulse count into the computer, both the counter for the timing pulses and the displacement pulses are momentarily inhibited when the displacement count becomes equal to the preselected displacement count. Resumption of counting by both the displacement pulse counter and the timing pulse counter is resumed in a synchronous manner with the occurrence of the displacement pulses to insure accuracy.

In the copending Reuther application, the speed signal, calculated as a function of the time required to accumulate a predetermined count of displacement pulses is referred to as the fine speed signal because it has a resolution of approximately plus or minus 1 rpm at the synchronous speed of the turbine. The speed signal, which is calculated as a function of the number of displacement pulses accumulated in a predetermined time, is referred to as the coarse speed signal because it has a resolution of approximately plus or minus 5 rpm's at synchronous speed. However, when it is considered that the speed signal must be derived over the full operating range of the turbine, it is apparent that at the lower speeds, during start-up or shut-down, the fine speed calculation is not practical. This is due to the length of the time intervals required to accumulate the predetermined number of displacement pulses, such as 720, for example. At the lower rpm's the timing pulse count would be excessive requiring a counter with many more digits. Although the system of Reuther is accurate and reliable over the full range of turbine operating speeds, it is necessary to calculate both the coarse and fine speed signals; and then test the coarse speed signal to see if it is below or above a switch-over speed. This, in effect is a dual system. In view of the above, it is desirable to provide a system which is accurate and reliable over the full range of turbine operating speeds without the necessity of a dual system. Further, it is desirable to be able to provide a speed determining system that may be directly connected to the inputs of a digital computing apparatus without the necessity of logic circuitry for selecting one or the other of two calculated speed signals; and to provide a speed determining system where the direct count of pulses in a pulse train during predetermined intervals corresponds to the binary number corresponding to the rotational speed without further calculation.

SUMMARY OF THE INVENTION

A system for determining the rotational speed of a shaft. Displacement pulses are generated as a function of incremental shaft rotation. In response to each displacement pulse, a predetermined number of additional pulses are injected in the pulse train. The system provides for counting the displacement and additional pulses during predetermined time intervals. The total count of the generated pulses at the termination of each of the time intervals directly determines in binary form the rotational rate of speed for a time interval substantially greater than the predetermined time intervals.

The train of displacement and generated pulses are uniformly spaded for a predetermined speed of the shaft.

DESCRIPTION OF THE PREFERRED EMBODIMENT

Figure 1:
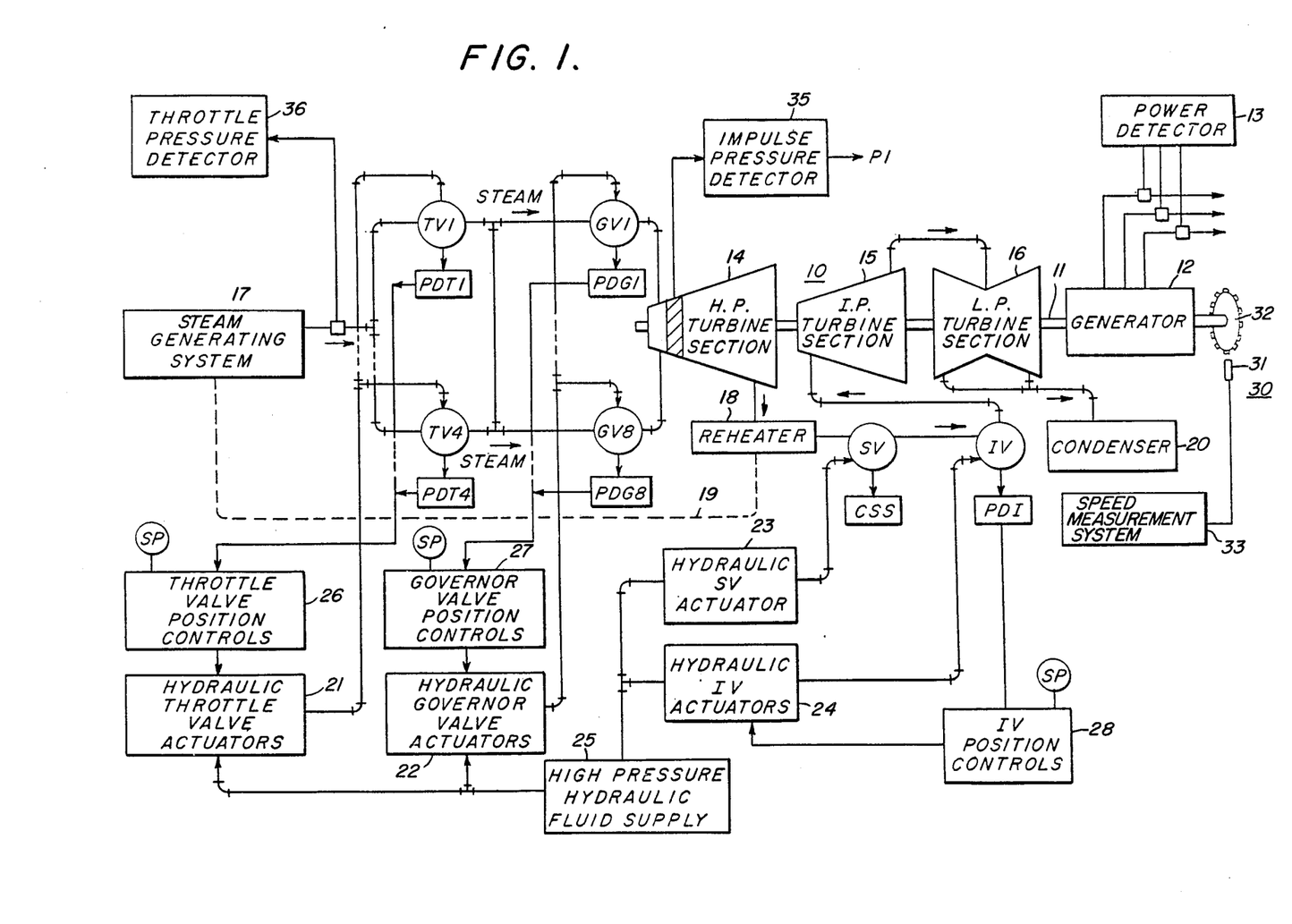
FIG. 1 is a schematic block diagram of an electric power plant which incorporates a steam turbine system embodying the invention.

Referring to FIG. 1 the turbine generally referenced to at 10 is provided with an output shaft 11 which drives a conventional large alternating current generator 12 to produce three-phase electric power as measured by a conventional power detector 13. The generator 12 is connected to a large electric power network and once so connected causes the turbo-generator arrangement to operate at synchronous speed, such as 3600 rpm under steady state condition. Under transient electric load conditions, system frequency may be affected resulting in turbo-generator speed changes. At synchronism, power contribution of the generator 12 to the network is normally determined by the turbine speed flow which in this instance is supplied to the turbine 10 at substantially constant throttle pressure.

The turbine 10 is of the multi-stage axial flow type and includes a high pressure section 14, an intermediate section 15, and a low pressure section 16. The steam for driving the turbine 10 is developed by a steam generating system 17 which may be of the form of a conventional drum type boiler operated by fossil fuel. Steam flow is directed to a turbine steam chest (not specifically shown) through throttle inlet valves TV1–TV4. From the steam chest, the steam is directed through the high pressure section to governor inlet valves GV1–GV8. It is understood that the system of the invention is suitable for use with other types of turbines and steam generating plants; however, it will be described as applied to a steam turbine system of the type described in the referenced application Ser. No. 408,972.

After the steam is coursed through the high pressure section of the turbine, it is directed to a reheater system 18 which is connected with the boiler 17 then heat transfer relation is indicated by the reference character 19. The reheated steam flows from the reheater system 18 through the intermediate section 15 and the low pressure section 16. From the latter the steam is exhausted to a condenser 20 and then through a feedwater system (not shown) back to the boiler 17.

To control the flow of reheat steam, stop valving SV including one or more check valves is normally open and is closed only to prevent steam backflow and to protect against turbine overspeed. Intercept valving IV is also provided in the reheat steam flow path. It is normally open but operates over a range of positioning control to provide reheat steam flow cutback modulation under turbine overspeed conditions.

Separate hydraulically operated throttle valve actuators, collectively referred to at 21, are provided for the throttle valve TV1–TV4. Similarly, separate hydraulically operated governor valve actuators, collectively referred to at 22 are provided for the governor valves GV1–GV8. Hydraulically operated actuators 23 and 24 are also provided for the reheat stop and intercept valving SV and IV. A computer sequenced and monitored high pressure supply 25 provides the controlling fluid for actuator operation of the four throttle valve TV1–TV4, the eight governor valve GV1–GV8 and valving SV and IV.

The actuators 21, 22, 23, and 24 are of conventional construction. The inlet valve actuators 21 and 22 and the intercept actuators 24 are operated by stabilizing position controls indicated collectively by the reference characters 26, 27 and 28 respectively. The position controls each include a conventional analog controller (not shown), which drive a suitable known actuator servo-valve (not shown) in a well known manner. The reheat stop valve actuators 23 are manually or computer controlled to be fully open unless conventional trip system operation or other operating means causes them to close and stop the reheat steam flow.

Steam valving position is controlled to produce control over steam flow as an intermediate variable and over turbine speed and/or load as an end controlled variable. Actuator operation provides the steam valve positioning, and respective valve position detectors PDT1–PDT4, PDG1–PDG8, and PD1 are provided to generator respective valve position feedback signals for developing position error signals to be applied to the respective position control 26, 27 and 28. One or more contact sensors CSS provides status data for the stop valving SV.

The combined position control, hydraulic actuator, valve position detector elements and other miscellaneous devices (not shown) form a local hydraulic-electrical analog valve position control loop for each throttle or governor inlet steam valve. Position set points SP are computer determined and supplied to the respective local loops an updated position on a periodic basis. Set points SP are also computed for the intercept valve control.

A speed sensing system generally referred to at 30 is provided to determine the turbine shaft speed for speed control and for frequency participation control purposes. The speed sensing or detecting system 30 includes a reluctance pickup 31 magnetically coupled to a toothed wheel 32 connected to the turbo-generator shaft 11. The AC signal generated by the reluctance pickup 31 as the toothed wheel 32 rotates when the turbo-generator, activates a speed measurement system 33 to generate pulses as each tooth on the toothed wheel 32 passes the reluctance pickup 31. Athough the combustion of a toothed wheel and reluctance pickup is described, other conventional means of sensing shaft rotation may be used.

The speed measurement system 33 is, in the present embodiment of the invention, an integrated circuit that converts the displacement signal pulses directly into a 13-bit binary number for input to the computer as described in detail hereinafter.

The signals produced by the speed detector system 30, the power detector 13 and pressure detectors 34 and 35, the valve position detector PDT1–PDT4, PDG1–PDG8, and PDI, status contacts (not shown) are employed in computer operation of the turbine 10 for various purposes including controlling turbine performance on an on-line reel time basis.

Figure 2:
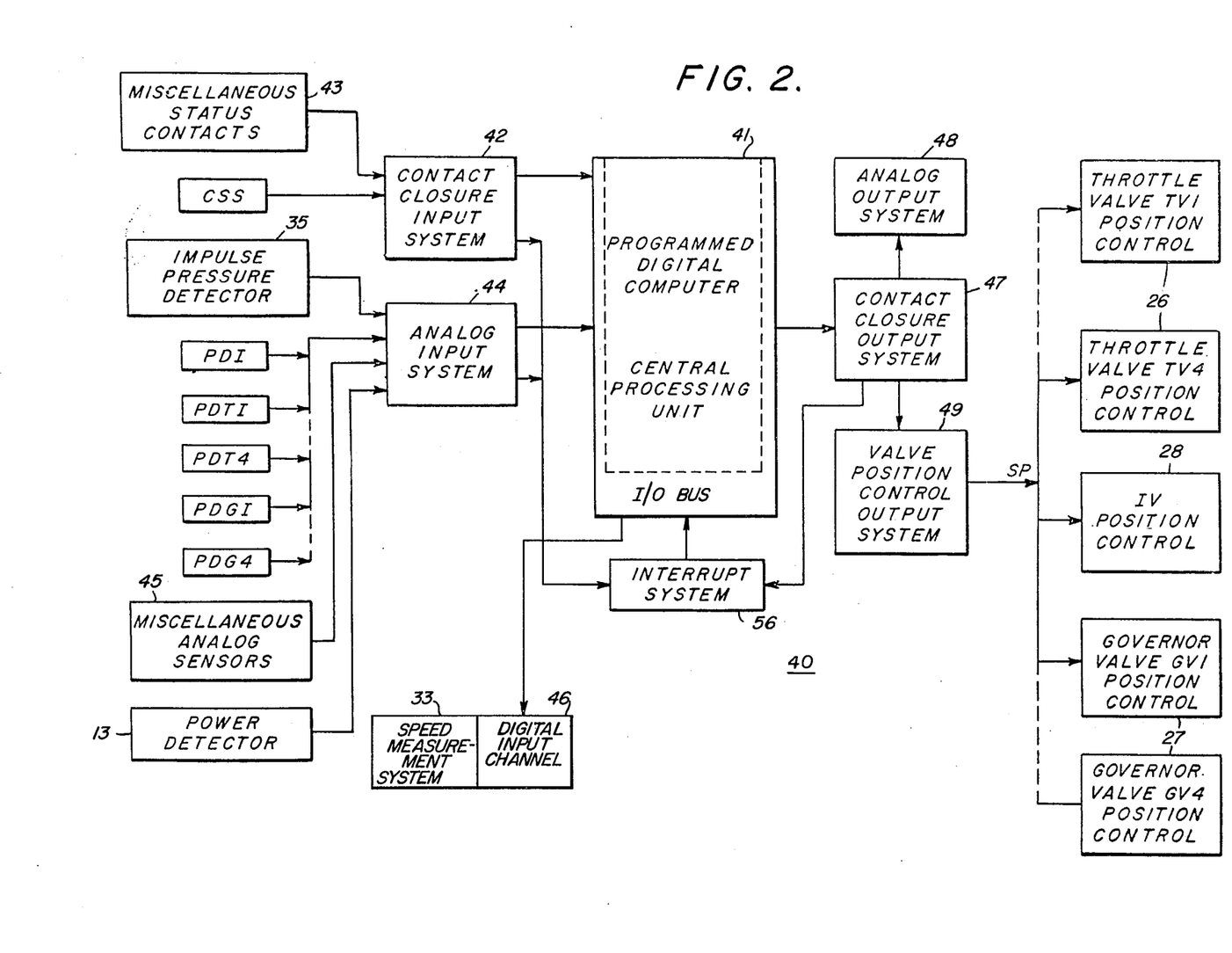
FIG. 2 is a schematic block diagram of a programmed digital computer system adapted to control the steam turbine system included in FIG. 1 in accordance with the principles of the invention.

Referring to FIG. 2, a digital control system generally referred to as 40, is provided for operating the turbine 10. The system 40 includes conventional hardware in the form of a central processing unit 41 and associated input/output interfacing equipment such as that sold by Westinghouse Electric Corporation under the tradename PRODAC 2000 (P2000). The P2000 computer is described in more detail in the copending referenced application Ser. No. 408,972.

The interfacing equipment for the computer processor 41 includes a conventional contact closure input system 42 which scans contacts of other similar signals representing the status of various plant and equipment condition. Such contacts include the stop valve contact CSS and are otherwise generally indicated at 43.

Input interfacing is also provided by an analog input system 44, which samples analog signals from the speed measurement system 33, the impulse pressure detector 35, the power detector 13, the valve position detectors PD1, PDT1–PDT4 and PDG1–PDG8, and miscellaneous analog sensors 35 such as the throttle pressure detector 36 (not shown in FIG. 2), various steam flow detectors, various temperature detectors, various pressure detectors, etc.

Additional input equipment in the form of the speed measurement system 33 and its associated digital input channel 46 to be described in greater detail hereinafter, converts the displacement pulses generated by the magnetic pickup 31 from the toothed wheel 32 into a binary number for direct entry into the central processing unit 41.

Output interfacing is provided for the computer by means of a conventional contact output system 47 which operates in conjunction with a conventional analog output system 48 and with a valve position control output system 49. The digital output signals supplied to the valve position control output system 49. The digital output signals supplied to the valve position control output system 49 are converted into analog signals which are applied to the valve controls 26, 27 and 28. The respective signals apply to the valve controls 26, 27 and 28 are the valve position setpoint signals SP (FIG. 1). Output signals from the I/O bus of the central processing unit 41 are also applied directly to the digital input channel 46 of the speed measurement system 33 in a manner to be described hereinafter.

The conventional interrupt system 50 is provided with suitable hardwired circuitry for controlling the input and output transfer of information between the processor 41 and the digital input/output equipment. Thus, an interrupt signal is applied to the processor 41 and the input is ready for entry or when an output transfer has been completed. In general, the central processor 41 acts on interrupts in accordance with the conventional executive program. In some cases, particular interrupts are acknowledged and operated upon without executive priority limitations.

Figure 3:
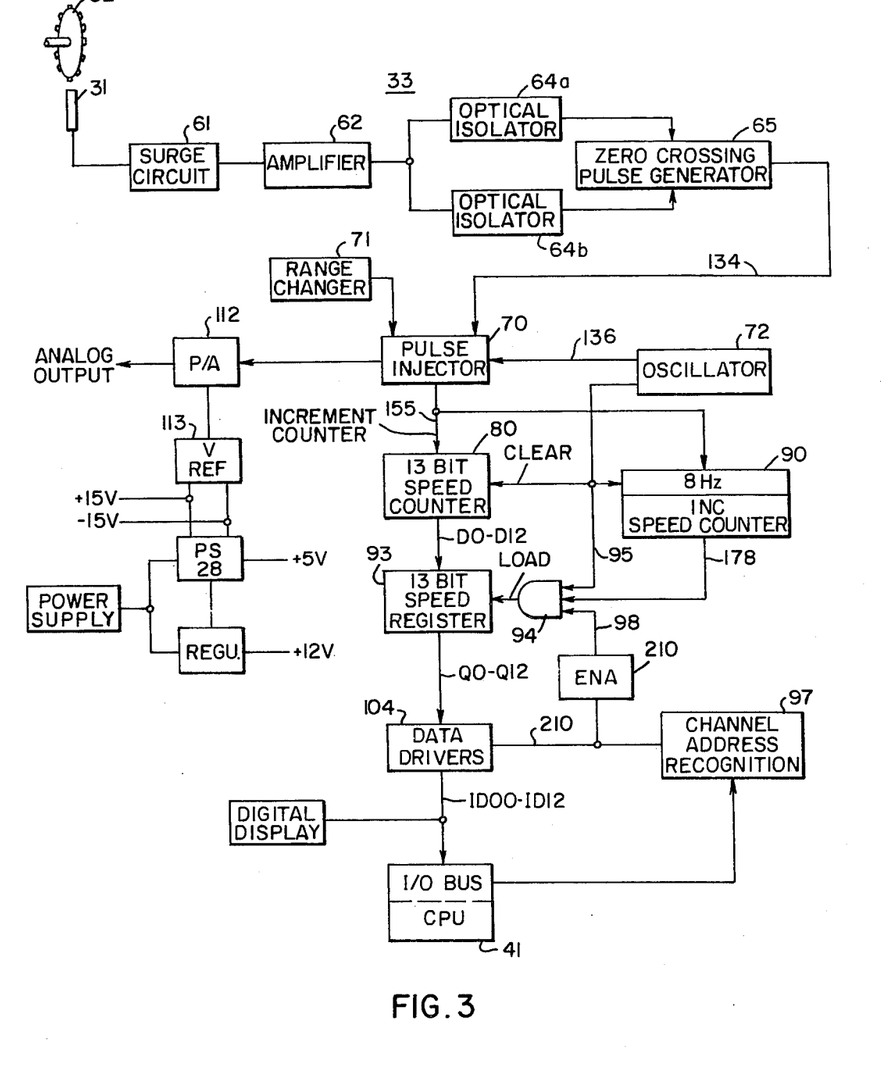
FIG. 3 is a schematic functional block diagram of a speed measurement system according to one embodiment of the invention shitable for use with the systems of FIGS. 1 and 2.
Figure 4:
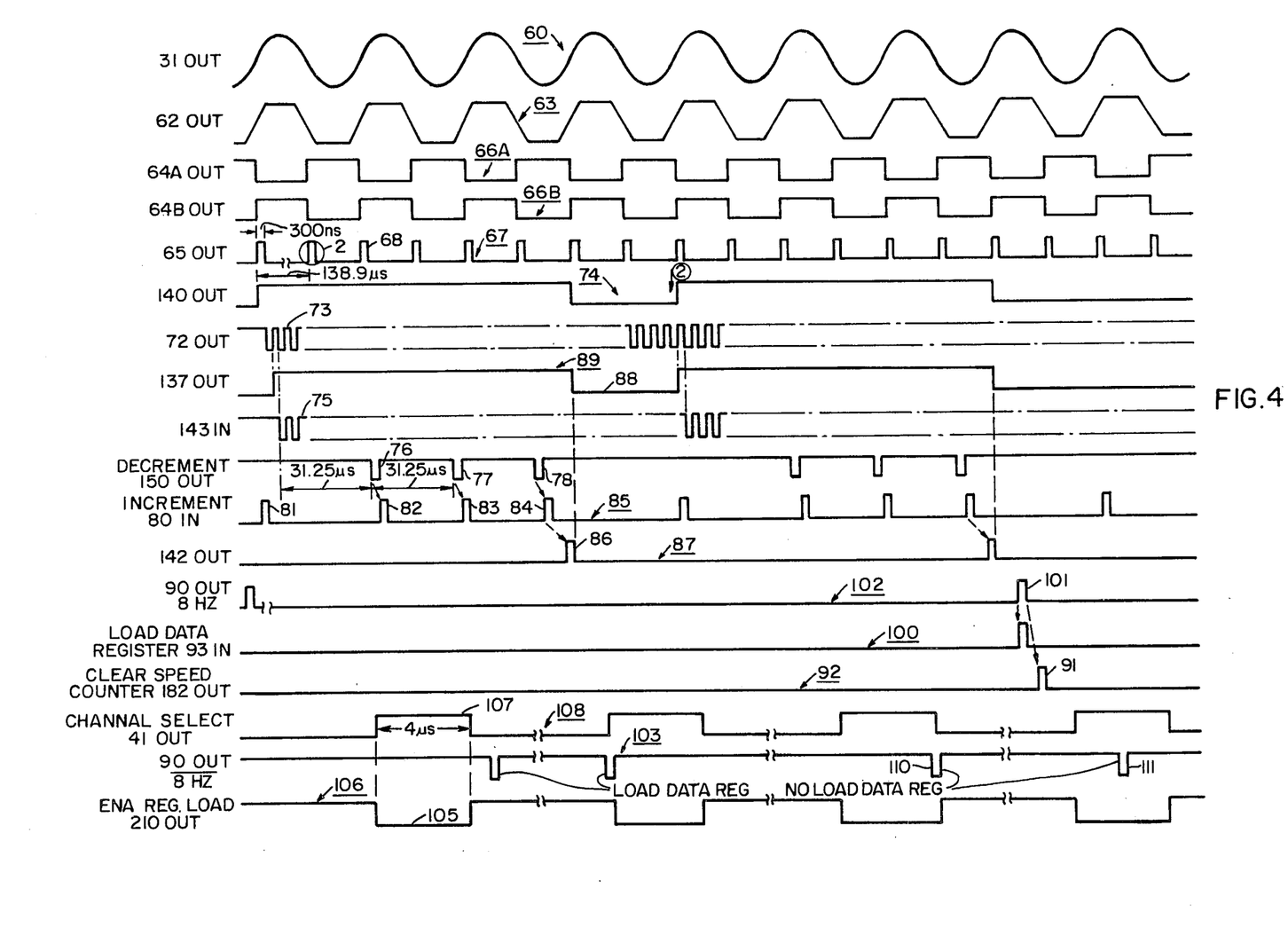
FIG. 4 is a timing diagram illustrating the sequence of operation of the system of FIG. 3.

Referring to FIG. 3, the detailed function of the speed measurement 33 (FIGS. 1 and 2) will be described in connection with the timing diagram of FIG. 4. The toothed wheel 32 in a typical turbine installation has 60 equally spaced teeth on the periphery of the wheel to generate the displacement pulses in cooperation with the reluctance pickup device 31. When the leading and trailing edge of each tooth of the wheel 32 passes the reluctance pickup 31, an individual electrical output occurs approximating a sine wave. A wave form 60 (FIG. 4) represents the signal output of the pickup 31 to a surge protection device 61. Each complete individual sine wave represents the influence of one tooth of the wheel 32 passing the pickup 31 in a well known manner. The device 61 merely protects an amplifier 62 from any voltage surges; and provides an input voltage to the amplifier 62 corresponding to a wave form 63 which illustrates the clipping of the peaks of each wave of the wave form 60. Thus, for each complete revolution of the wheel 32, the clipped sine wave 63 has crossed zero; that is, has undergone a transition from negative to positive, and positive to negative 120 times, or twice the number of teeth on the wheel 32. The output of the amplifier 62 is connected to the input of two optical isolators 64a and 64b, which couple the signal from the amplifier 62 to a zero crossing pulse generator 65. The isolators 64a and 64b provide isolation between the amplified wave form 63 and the logic of the speed measurement system. Thus, any noise that might get into the signal is isolated from the logic circuitry. One of the optical isolators detects a transition of the wave form 63 from negative to positive; and the other detects a transition of the wave form 63 from positive to negative. As shown in FIG. 4, wave form 66a represents a square wave output of the optical isolator 64a, which produces a pulse in response to each transition of the wave form 63 in one direction; and wave form 66b represents the output of the optical isolator 64b in response to the transition of the wave form 63 in the other direction; or in other words, a pulse is applied to the input of the zero crossing pulse generator 65 in response to each transition of the wave form 63. The pulse generator 65 produces a short pulse in response to each output pulse of 64a and 64b as represented by wave form 67. Thus, for each revolution of the wheel 32 a total of 120 short pulses of the type referred to at 68 are generated. In one embodiment of the invention, each of these pulses 68 approximate 300 nanoseconds in duration.

The system of the present invention is such that the greatest accuracy of measurement occurs at its required operating speed. For example, in the present embodiment of the ivention, the turbine system is operated at a synchronous speed of 3600 revolutions per minute to produce electricity at 60 Hertz. Also, in order for the binary output to be read directly by the computer without further calculation within the computer, the counted number of pulses are able to correspond directly to the speed measurement of the turbine. A pulse injector 70 responds to each one of the puulses 68 from the output of the pulse generator 65 to produce an additional selected number of equally spaced pulses in response to the occurrence to each one of the pulses 68. In the present embodiment of the invention, a pulse injector 70 generates three pulses in response to each zero crossing output pulse from the generator 65. At a speed of exactly 3600 revolutions per minute, all of the pulses including the zero crossing pulse which occurs subsequent to the third pulse that was injected in response to the previous zero crossing pulse has the same spacing. The pulse injector 70 also includes a range changer 71 having jumper connections that provide for pulse injection that may be equally spaced at 1500, 1800, 3,000 or 3600 revolutions per minute depending upon the particular installation. When the turbine decreases its speed from 3500 rpm, the spacing between the third injected pulse and the subsequent zero crossing pulse in the train increases. When the turbine increases its speed, the space between the third injected pulse and the subsequent zero crossing pulse decreases. A detailed description of the pulse injector 70 will be given in connection with the description of FIG. 6.

An oscillator 72, which is a free running crystal oscillator, drives the pulse injector 70 for spacing the injected pulses. In the present embodiment of the invention, where all of the pulses including the zero crossing or displacement pulses are equally spaced from each other at an operating range of 3600 rpm, the injection pulses are approximately 35 microseconds apart with the first injection pulse being 35 microseconds from the zero crossing pulse preceding it. Referring again to FIG. 4, the zero crossing pulse generator 65 operates the pulse injector 70 to a condition represented by the elevated portion of the wave form 74. During the duration of the elevated portion of wave form 74, the oscillator 72 produces a wave form 73 for operating counters within the pulse injector 70 as described in detail hereinafter to produce output pulses referred to at 76, 77 and 78 in response to each zero crossing pulse of the wave form 67. The zero crossing pulses together with the pulses 76, 77 and 78 increment a speed counter 80 in response to each of the pulses as represented at 81, 82, 83 and 84. In response to the third injected pulse following each zero crossing or displacement pulse, as represented by pulse 86 of wave form 87, the pulse injector is cleared to respond to the next zero crossing pulse from the pulse generator 65 as represented by portion 88 of wave form 89. Nothing occurs until the next output from the zero crossing pulse generator, at which time, the pulse injector 70 is operated as previously described to generate three additional equally spaced pulses for incrementing the speed counter 80. Thus, in response to each zero crossing pulse, the speed counter 80 is incremented four times.

In the described embodiment of the invention, the number of pulses counted by the speed counter 80 during a period of one-eighth of a second determines the actual speed of the turbine generator. This eighth of a second function is represented by block 90 of FIG. 3. At the end of each eighth of a second, the speed counter 80 is cleared, and the pulse injector 70 commences incrementing the speed counter again. The speed counter 80, which is cleared after the speed data register is loaded, is represented by pulse 91 of wave form 92. Each pulse from the function block 90 also loads a speed data register 93 with the count that is present in the speed counter 80. In order to transfer the count from the speed counter 80 to the speed register 93, an AND function referred to at 94 permits the loading of the register 93 only in response to an oscillator pulse as shown by input 95 at times when the speed counter 80 is not being incremented as shown by input 96; and at times when the transfer decision logic referred to in block 97 is permissive as shown by input 98 to the AND function 94. Referring to FIG. 4, a wave form 100 illustrates the enablement of loading the data register in response to the pulse 101 of wave form 102 which occurs eight times a second. As shown by wave form 103, the register 93 may be loaded at times when data drivers 104 (FIG. 3) are not transferring data to the central processing unit 41. The wave form 103 represents the register load signal. Wave form 106 represents the inhibiting of the loading during channel select activity. Portion 105 of the wave form 106 represents the time at which the input to the computer can occur. Pulses 110 and 111 of wave form 103 represents the time of occurrence of a register load signal when a loading does not occur. The data register may be loaded at any time prior to or following the occurrence of a pulse 105.

The system 33 also provides an analog output by way of the pulse injector 70 to a function block 112. Recalling that portion 88 of the wave form 89 corresponds to the time between the third additional or injection pulse and the subsequent zero crossing pulse, a function 112 includes an analog switch which is enabled in response to the output from the pulse injector 70. Thus, in cooperation with a voltage reference 113, it provides a constant width pulse at twice the frequency of the input, which is generated and converted to a direct current voltage output level between 0 and 10 volts which is directly proportional to the pulse frequency. The details of such analog output form no part of the present invention.

To summarize the timing considerations for a speed measurement system where the nominal sped is 3600 revolutions per minute in accordance with the present embodiment, it will be recalled that at such nominal speed there will be 7200 zero crossings per second. With a 13 bit speed register being updated eight times per second, results in 900 zero crossings during each eighth of a second at the nominal speed of 3600 revolutions per minute. In order for the 13 bit binary speed number to correspond directly to 3600 revolutions per minute, each zero crossing results in an accumulation of four counts (zero crossing pulse and three injection pulses) in the 13 bit speed counter. In order to produce equally spaced count pulses when the speed is exactly 3600 revolutions per minute, the spacing of the count pulses must be approximately 34.72 microseconds at such speed. With reference to FIG. 3, the output of the data drivers 104 represented as IDOO to ID12 represent the binary inputs which correspond to the exact speed count during each eighth of a second. IDOO represents the least significant bit of data and ID12 represents the most significant bit of data. A digital indicator such as 99 may be also provided, for a direct reading of the speed. To summarize the functional operation of FIG. 3, the signal pulses from the toothed wheel 32 are brought into the system through the reluctance pickup 31. The system is protected against high frequency noise and high amplitude signal pickup by a surge protection device 61. The signal is then fed into the amplifier 62, which provides at its output the substantially rectangular wave form 63. This wave form is fed into the optical isolators 66a and 66b which add signal isolation and convert the rectangular wave form 63 to a logic level signal of the same frequency represented by the wave form 66a and 66b. These signals pass into a zero cross pulse generator 65 to produce the 300 nanosecond pulses shown by the wave form 67. Each zero cross output, such as 68, is converted into the equivalent of four counts to be stored in the speed register 93. This is achieved by way of the free running crystal oscillator 72 time base which is used as a clock for operating the pulse injector 70. The oscillator 72 is also used to clock a counter in device 90, the output of which is used as a time strobe which occurs at eighth of a second intervals. This time strobe is used to load the speed register 93 which stores the speed count 80 that was accumulated during the previous time period. After loading the speed register 93, the time strobe clears the speed counter 80 thus initiating a new eighth of a second cycle period. The output of the speed register 93 is connected to the input data drivers 104 which can be selected asynchronously by the running software program. Register loading is inhibited if an input operation is in progress. For example if a time strobe occurs with no channel select present on the computer, the speed register is loaded. If the time strobe has begun and is still existent when the channel select occurs, the data from the counter 80 is loaded into the speed register 93. In the event the time strobe occurs during a channel select and does not complete until after the channel select is finished, the enable for the load register becomes disabled at the beginning of the channel select pulse and remains disabled until the time strobe is completed. In this instance, the speed register 93 is not loaded. In the event that the time strobe occurs completely within the channel select, the speed register is not loaded.

Referring to FIGS. 5-8, which illustrate schematically the circuit details of the system 33 of FIG. 3, incorporates C/MOS technology to the greatest possible extent to reduce power dissipation; and, is structured completely in a printed circuit board. The FIGS. 5-8 are included in enough detail to enable one skilled in the art to practice the present invention; however, each portion of the detailed circuit will be briefly described with respect to its principles of operation.

Figures 5, 9:
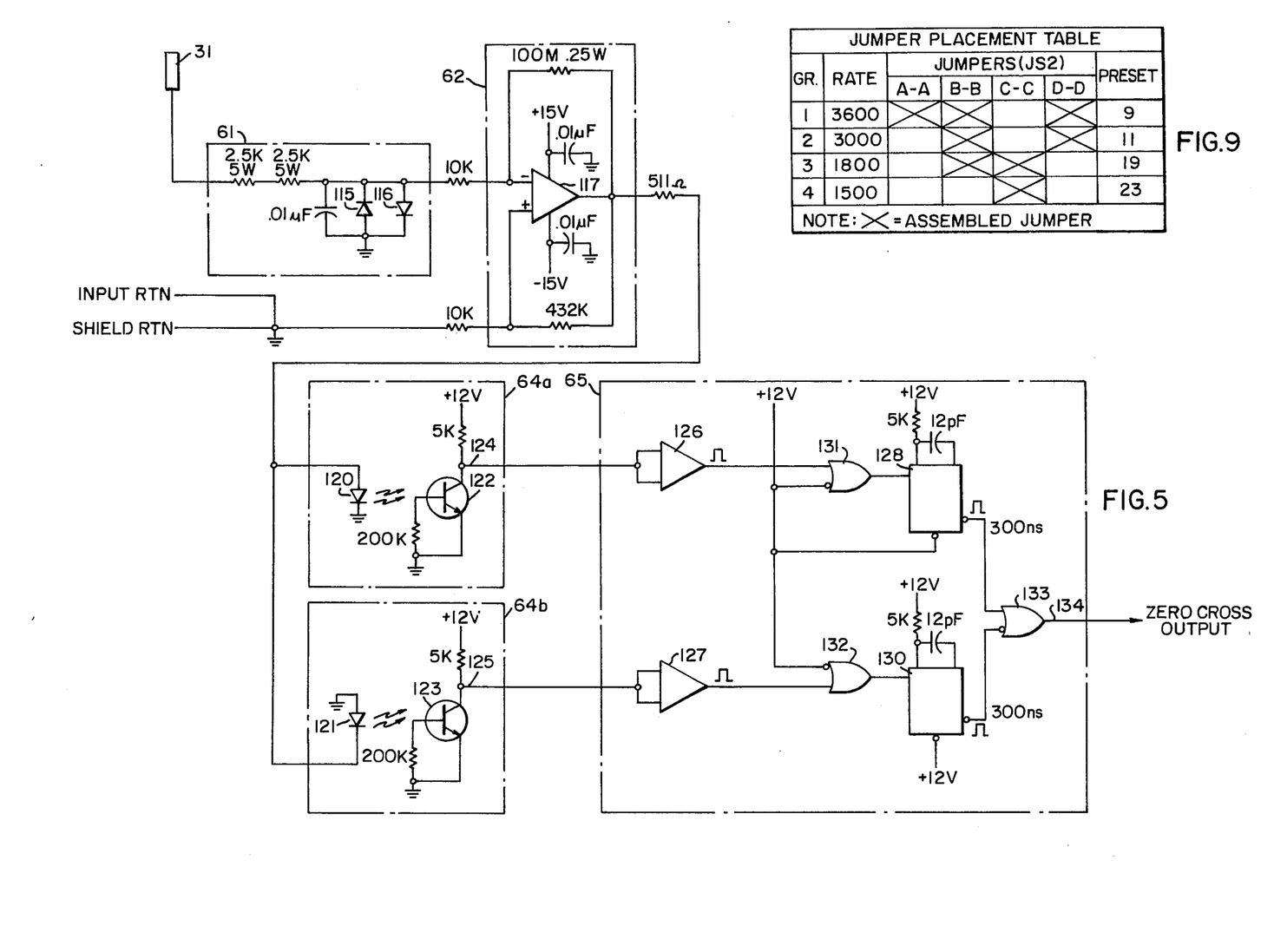
FIGS. 5–8 illustrate schematically the detailed circuitry for performing the functions of the system of FIG. 3. The portions of the circuitry in each of the FIGS. 5–8 contained with the dashed lines correspond to similarly referenced blocks of FIG. 3.
FIG. 9 shows the various connections of the pulse injector of FIG. 6 for changing spacing of pulses for different predetermined speeds.

Referring to FIG. 5, the function blocks of FIG. 3 are included within the similarly referenced dashed lines. The surge protector 61 is comprised of a pair of diodes 115 and 116 which function to clip the sine wave input from the reluctance pickup 31 to approximately 0.7 volts. The circuitry within the dashed line 62 includes a linear operational amplifier 117 which acts as a comparator to avoid 60 ctcle distortion of the low amplitude input. The optical isolator 64a and 64b, which receive the substantially rectangular wave form of the same frequency as the input, include light emitting diodes 120 and 121 respectively. The positive going portion of the wave form causes the diode 120 to conduct which produces an output to a phototransistor 122; and the negative going portion of the wave form causes the diode 121 to conduct to switch on a phototransistor 123. Thus, the positive going portion of the wave form produces an output pulse on collector 124 of the transistor 122, and a negative going portion of the wave form produces an output on a collector 125 of the transistor 123.

The zero crossing pulse generator 65 includes inverters 126 and 127 which are connected to the outputs of the transistors 122 and 123, respectively. A dual monostable multi-vibrator 128 is turned on to produce a 300 nanosecond pulse in response to an output from the inverter 126; and a dual monostable multi-vibrator 130 is turned on in response to a pulse from the output of the inverter 127. The mono-stable multi-vibrators 128 and 130 alternately turn on to produce the 300 nanosecond pulse by the conduction of its gate portions 131 and 132 in a conventional manner. A NAND gate 133 permits the pulses from each of the multi-vibrators 128 and 130 to output on line 134 in accordance with the wave form 67 (FIG. 4).

Figure 6:
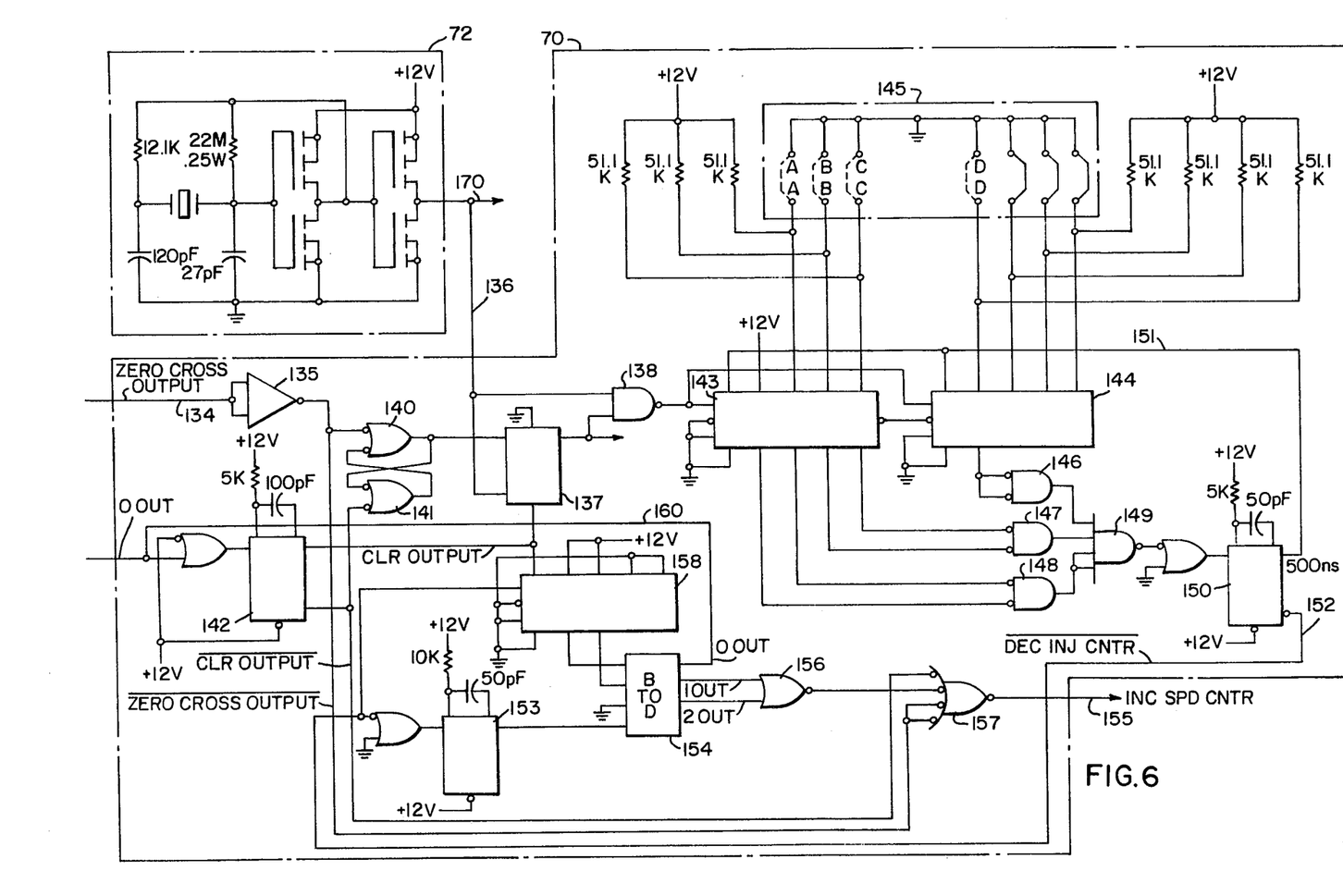
Figure 7:
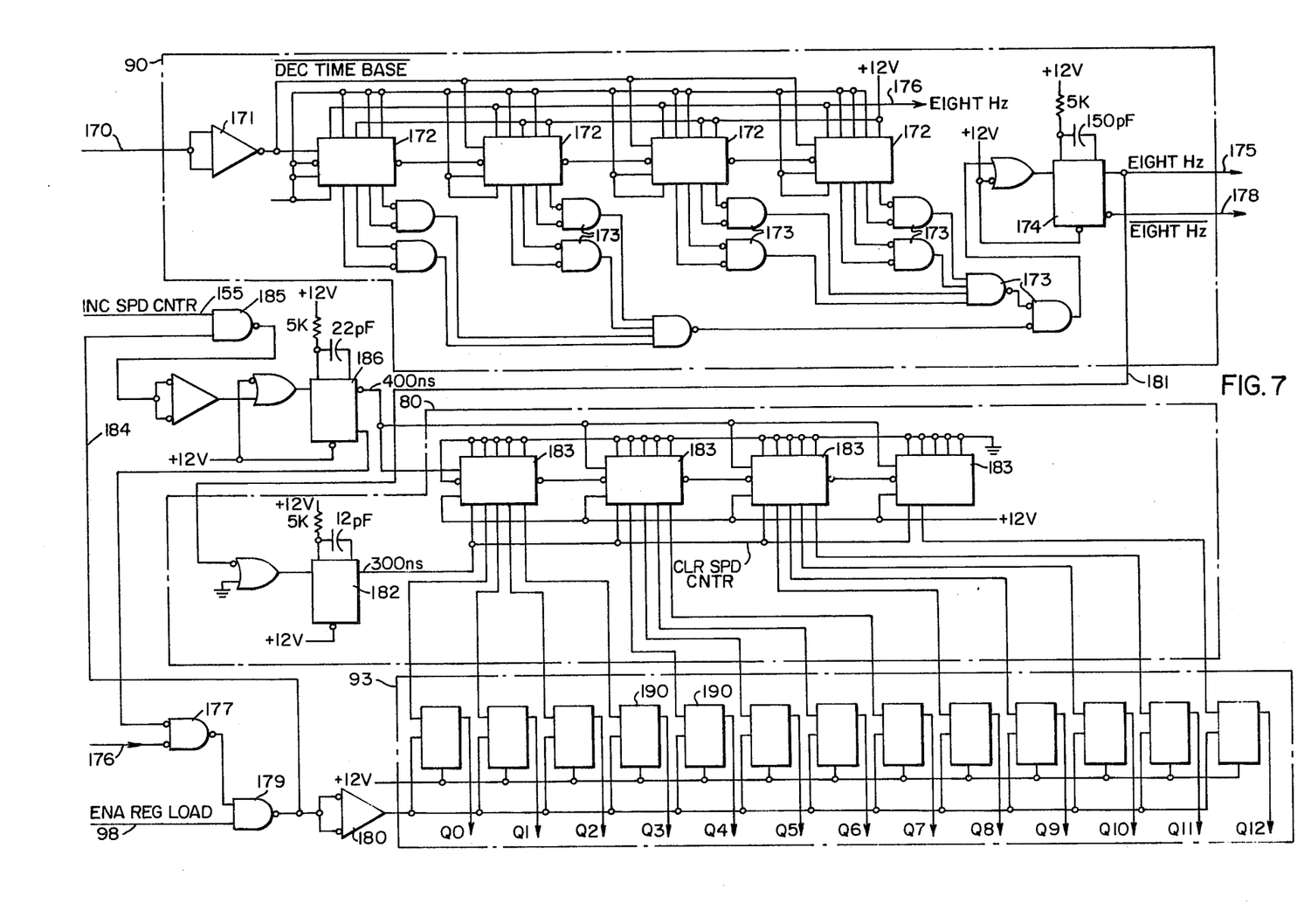

Referring to FIG. 6, the pulse injector within the dashed lines 70 accepts the signal from the line 134 by way of inverter 135; and the pulse injector is driven by the crystal oscillator within the dashed lines 72. The pulses from the free running oscillator 72 appear on output 136; and are applied to a flip-flop circuit 137 of the dual type and the input of a NAND gate 138. The flip-flop 137 is set by the occurrence of a 1 at the output of NAND gate 140; and operated to its other condition by a pulse from the output of the oscillator 72 over the line 136. Once the flip-flop 137 is in this set state, the gate 138 conducts and responds to each oscillator pulse from the line 136. Thus, each displacement or zero crossing output pulse is synchronized with a pulse from the oscillator 72. Also, a NAND gate 141 is connected to the NAND gate 140 and vice versa so that the flip-flop 137 does not permit the NAND gate 138 to conduct after the output of a multi-vibrator 142 has a cleared flip-flop 137. Thus, in response to a displacement pulse, and upon the occurrence of the next pulse from the oscillator, counters 143 and 144 are decremented in response to each oscillation pulse. The counters 143 and 144 which are binary up-down counters are preset to count down from a preselected number in accordance with the connection of a plurality of jumpers within dashed line 145. The connection of the jumpers presets the counters to a particular number as indicated in FIG. 7 for a selected nominal speed rate for the speed measurement system, as previously described in connection with FIG. 3. In the present embodiment of the invention where the jumpers 145 are set for a rate of 3600 revolutions per minute, the time required to count down to zero is approximately 31 microseconds. Thus, the time between the zero crossing pulse and the first injection pulse is 31 microseconds, which is also equal to the time between consecutive injection pulses. Upon the detection of a zero conduction of the counters 143 and 144 by NOR gates 146, 147 and 148, which provide an input to NOR gate 149, a dual monostable multi-vibrator 150 changes state to produce an output pulse on line 151 for resetting the counters 143 and 144 to the preselected count. The output of the monostable multi-vibrator 150 also applies a pulse simultaneously on line 152 to change the state of a dual monostable multi-vibrator 153, the output pulse form which operates a binary-to-decimal converter 154, applies a pulse on line 155 through NOR gates 156 and 157 to increment the speed counter 80 by one count. The pulse on line 152 in response to the zero count of the counters 143 and 144, also operates a counter 158 to keep track of the number of times that the speed counter was incremented over the line 155 in response to the displacement or zero crossing pulse occurring on the line 144. In response to the third time that the counters 144 and 143 are counted to zero representing the generation of three additional pulses, the converter 154 detects such occurrence; and a pulse is applied on line 160 to operate the dual monostable multi-vibrator 142, which applies a signal on line 161 to prevent further incrementing of the speed counter on the line 155, and also to change the state of the flip-flop circuit 137, which prevents any further operation of the counters 143 and 144 in response to the oscillator pulses on the line 136 until such time as the next zero crossing output occurs on the line 134.

Referring again to FIG. 6, the oscillator 72 has an output 170 which applies the pulses to an inverter 171 at the input to a plurality of binary up/down counters collectively referred to at 172 which comprise the function block 90 (FIG. 3). The frequency of the pulses from the oscillator are such that the counters 172 count down to zero each eighth of a second. Through a plurality of NOR gates collectively referred to at 173, in response to a zero count, a dual monostable multi-vibrator 174 is operated to provide the microsecond pulse at output 175.

The monostable multi-vibrator 174, which applies the 8 hertz pulse on line 175, also has an output 178 representing the absence of an 8 hertz pulse, which is applied to the input by a NOR gate 177. The output of the NOR gate 177 is applied as one input to a NAND gate 177; the other input being the enable register load input 98. The other input to the NOR gate 177 is the output of monostable multi-vibrator 186. A NAND gate 185 the output of which triggers the monostable multi-vibrator 186 has one input 184 from the output of the NAND gate 179 and the other input, the increment speed counts signal 155 from the pulse injector 70 which applies zero crossing outputs and injected pulses as previously described. Thus, NOR gate 177 checks to determine that if there is not an output pulse from the 8 hertz counter 174, and if 184 is not incrementing the speed counter, then a transfer can occur from the speed counter to the speed register. The NAND gate 179, the output of which is an inverter 180, serves to inhibit the increment speed counter signal. If the speed counter 80 is not being incremented at the time the 8 hertz signal occurs, no more increment counter signals can affect the counter 80 until the transfer from the speed counter 80 to the data register 93 is completed. Also, NAND gate 179 serves when an input to the computer occurs the enable register load signal at input 179 prevents the transfer from counter 80 to the register 93. At the end of each eighth of a second period, the data is transferred from the counter 80 to the data register 93. The data in the counter 80 is cleared in response to the operation of the monostable multi-vibrator 174 at the end of each eighth of a second period by the application of a pulse on line 181, which operates a monostable multi-vibrator 182 to clear the individual up/down binary counters, collectively referred to at 183, of the speed counter 80. Thus, from the foregoing description it is evident that each eighth of a second, the binary number in the speed counter 80 is transferred to the register 93 followed by a clearing of the speed counter 80 in preparation for the next input pulse on the line 155 which operates the dual monostable multi-vibrator 186 to increment the counters 183 of the speed counter 80.

The data register 93 to which the count from the speed counter 80 is transferred prior to being cleared each eighth of a second, is comprised of a plurality of C/MOS clocked "D" latch collectively referred to at 190 for each bit of the binary output of the speed counter 80.

Figure 8:
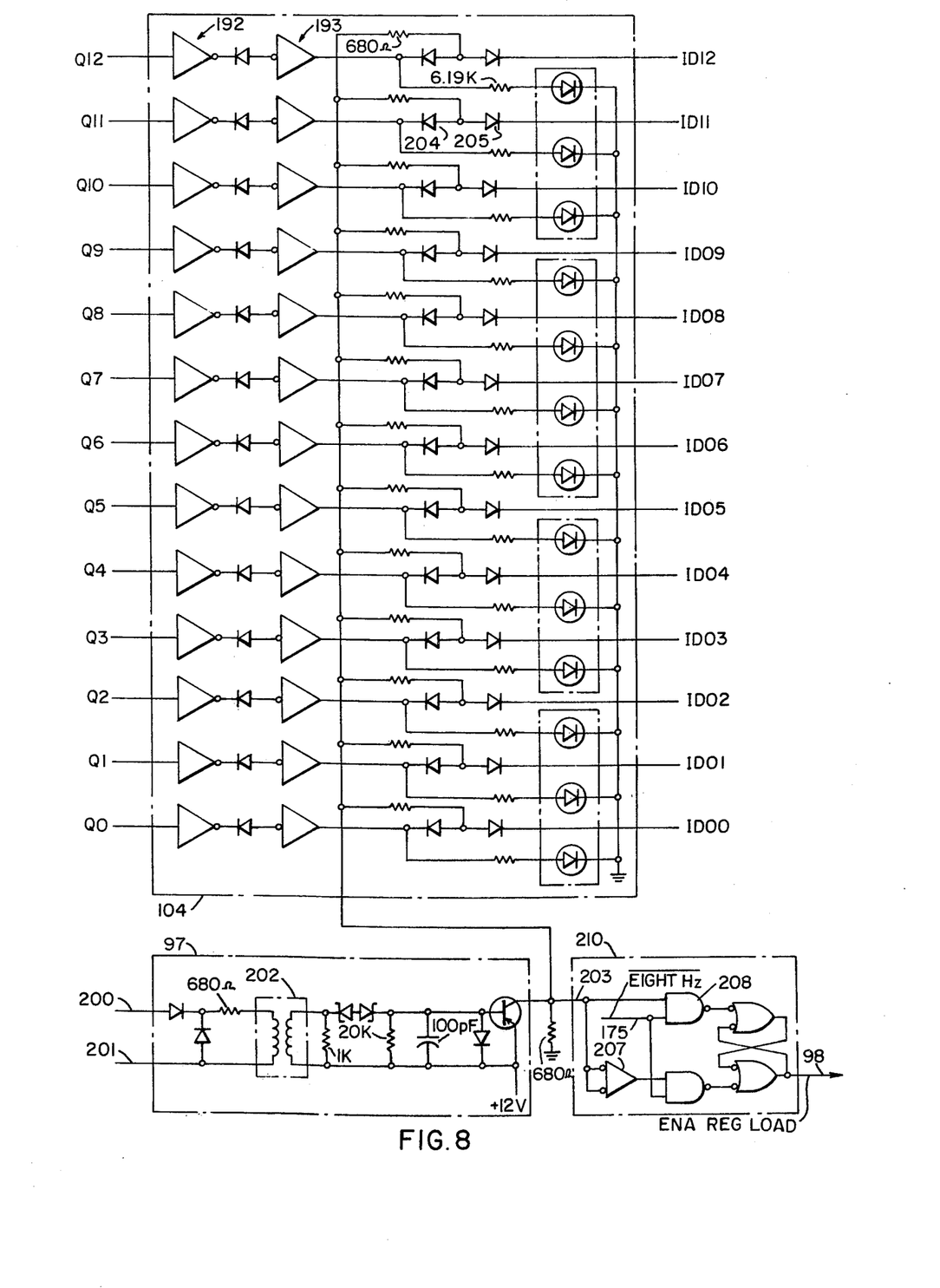

Referring to FIG. 8, the data drivers within the dashed line 104 are connected so that their input Q0 through Q12 inclusive is connected to output terminals that are similarly reference Q0 through Q12 respectively of the data register 93. The data drivers 104 each use a hex inverter high-level-to-low-level type and a C/MOS hex buffer converter of the inverting type, which is exemplified by reference numeral 192 and 193 respectively. Terminals referred to as ID00 through ID12 are adapted to be connected directly to the input of the central processing unit. Depending on whether the input is a low level or a high level pulse at the respective terminals Q0 through Q12, a similar output occurs which is of a different voltage value on the associated output terminals to the central processing unit 41 referred to as ID00 through ID12 respectively. Thus, each bit of information occurring on the terminals ID00 through ID12 is applied directly to the computer when selected by a channel select or address recognition function referred to at 97. In the channel address recognition function, terminals 200 and 201 are connected directly to the computer to the primary side of an isolation transformer 202. Asynchronously, the computer may produce a four microsecond pulse for example, at its output referred at 203 to produce either a high level or a low level binary pulse at its respective ID output. In absence of the 4 microsecond pulse on 203, the outputs ID are isolated by diodes such as 204 and 205. Thus, each time the computer calls for a read-in from the data drivers 104, the binary information is read directly into the computer. In one actual reduction to practice of the invention, the computer applies a 4 microsecond pulse to the inputs 200 and 201 every tenth of a second to read the binary information at the outputs ID through ID12. Each pulse from the computer on 203 is also applied to a NAND gate 207 and 208 to prevent the enablement input 178 (see also FIG. 7) from transferring what could be an incomplete count from the counter 80 to the data register 93. Also, the input 75 to the gate 205 serves to prevent the enablement of the output 178 to transfer the information from the counter 80 to the register 93 at the termination of each eighth of a second, as previously mentioned. The components within dashed line 210 perform the function as the similarly referenced function 210 of FIG. 3.

It is understood, that the system of the present invention may provide for more or less injected pulses than as described herein and that the uniform spacing of the displacement pulses and injection pulses may be provided for different speeds than those set forth. Although the speed measurement system is particularly adapted for digital turbine control, it is contemplated that other types of turbine control systems may incorporate the features herein, or a speed measurement system for other than turbine control. Also, various other modifications may be made in the details of the system described without departing from the spirit and scope of the invention as defined in the claims.

What is claimed is:

1. A system for controlling the operation of a power plant in accordance with selected criteria including rotational speed, comprising:
    a turbine in which an elastic fluid imparts rotation to an output shaft;
    valve means for controlling the flow of elastic fluid to the turbine;
    means for generating displacement pulses as a function of incremental shaft rotation;
    means governed by each generated displacement pulse to generate at least one additional pulse;
    means to count each generated displacement pulse and additional pulse occurring during identical predetermined time intervals;
    means to generate a binary representation in accordance with the total pulse count, said representation being a direct count of a shaft speed rate for a time interval greater than each said predetermined time interval, and
    means including the binary representation to control the operation of the valve means.

2. A system according to claim 1 wherein each additional pulse is uniformly spaced from its preceding displacement pulse at all speeds of the shaft, and each additional pulse is uniformly spaced from its succeeding displacement pulse at a predetermined speed, whereby each generated pulse is a function of uniform incremental rotation at said predetermined speed.

3. A system according to claim 1 wherein each additional pulse is generated in response to the immediately preceding displacement pulse.

4. A system according to claim 1 wherein the means to generate the displacement pulses, comprises a wheel having radially extending teeth affixed to the shaft, a reluctance pick-up adjacent the periphery of the wheel, a device operative to detect the zero crossing of an AC wave form generated by the motion of each tooth past the pick-up, and means to generate a pulse in response to each detected zero crossing.

5. A system according to claim 1 wherein the number of displacement pulses and additional pulses generated during each complete rotation of the shaft is equivalent to 60 divided by the time of each predetermined interval expressed in seconds.

6. A system according to claim 5 wherein each predetermined time interval is a fraction of a second.

7. A system for controlling the operation of a turbine power plant in accordance with selected criteria, including rotational speed, comprising:
    a turbine in which an elastic fluid imparts rotation to an output shaft;
    valve means for controlling the flow of elastic fluid to the turbine;
    a wheel having uniformly dimensioned radial projections and depressions affixed to rotate with the shaft;
    a reluctance pick-up means positioned adjacent the projections to generate a complete sine wave in response to the passing of each projection and depression;
    means to detect the zero crossing of each sine wave;
    means to generate a pulse in response to each detected zero crossing;

means responsive to each generated zero crossing pulse to generate a predetermined plurality of equally spaced additional pulses;

means to count the total of each zero crossing pulse and additional pulse occurring during successive predetermined time intervals and said time intervals being such that the total count corresponds to the speed of the shaft in revolutions per minute;

means to generate a binary number representation in accordance with the total count; and means including the binary representation to control the valve means.

8. A system for determining the rotational speed of a shaft, comprising means for generating displacement pulses as a function of incremental shaft rotation, means responsive to each generated displacement pulse to generate at least one additional pulse prior to the generation of each subsequent displacement pulse;

means to count each generated displacement and additional pulse during predetermined time intervals; and means responsive to the total count of the generated pulses at the termination of the time intervals to generate a binary number representative of a shaft speed rate for a time interval greater than the duration of said predetermined time interval.

9. A system according to claim 8 wherein each additional pulse is equally spaced from its preceding displacement pulse.

10. A system according to claim 8 wherein a predetermined plurality of additional pulses are generated in response to each displacement pulse, each of said plurality of additional pulses being spaced uniformly from its associated preceding displacement pulse.

11. A system according to claim 10 wherein each predetermined time interval is of a duration such that the total count of displacement and additional pulses directly corresponds to the measured revolutions per minute of the shaft.

* * * * *